United States Patent Office 3,325,464
Patented June 13, 1967

3,325,464
NOVEL POLYBUTADIENE-POLYHALOGENATED CYCLOPENTADIENE ADDUCTS
Edward D. Weil, Yonkers, N.Y., assignor to Hooker Chemical Corporation, Niagara, N.Y., a corporation of New York
No Drawing. Filed Oct. 14, 1966, Ser. No. 586,668
5 Claims. (Cl. 260—94.2)

This is a continuation-in-part of copending application S.N. 216,288, filed Aug. 13, 1962, now abandoned.

This invention relates to a novel halogen-containing polymer product and to a process for producing such a product. More particularly, the invention relates to a novel halogen-containing thermoplastic polymer produced from a rubbery polymer of butadiene.

It is known that dienes such as hexahalocyclopentadiene will react with certain unsaturated butadiene polymers by adding across the double bonds of the molecules. Thus far, commercially useful products have not been prepared by such a method because it has not been possible to achieve the incorporation of hexahalocyclopentadiene in the polymer to the extent of 0.5 mole of hexahalocyclopentadiene per mole of combined butadiene. The prior art products are brittle resins, not well suited for use in coating compositions and molding compounds.

Accordingly, it is an object of this invention to upgrade rubbery polymer products by reaction with a halogenated cyclic diene. It is another object of the invention to produce a novel polymer product having a very high halogen content. It is a further object of the invention to provide a method for chemically incorporating large quantity of polyhalogenated cyclopentadiene into a butadiene rubbery polymer. Still another object of the invention is to provide a plastic polymer product of a butadiene rubber and a polyhalogenated cyclopentadiene that is well suited for use in protective coatings such as paints, varnishes and the like, as well as in molding compounds. These and other objects of the invention will become obvious upon further consideration of the following detailed specification.

In accordance with this invention, there is provided a thermoplastic resinous reaction product of polybutadiene and a polyhalogenated cyclopentadiene having the formula:

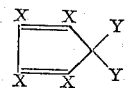

wherein X is selected from the group consisting of fluorine, chlorine and bromine, and Y is selected from the group consisting of fluorine, chlorine, bromine and an alkoxy radical; wherein the thermoplastic resin has the polyhalogenated cyclopentadiene reacted across greater than 50 percent of the original double bonds in the polybutadiene. The polyhalogenated cyclopentadiene is preferably reacted across at least about 55 percent of the double bonds, and usually across from about 60 to about 90 percent of the double bonds. When the reactant is hexachlorocyclopentadiene, the latter range provides a chlorine content in the range of about 59 percent to about 64 percent by weight.

It has been found that a product having such a high, and heretofore unattainable, halogen content can be obtained by reacting the polyhalogenated cyclopentadiene with a polybutadiene which contains at least 80 percent of cis-1,4 configuration.

Recently, processes have become available for the production of polybutadiene in which a very high percentage of the polymer is formed by cis-1,4 addition of the butadiene. One such process is described in U.S. Patent No. 3,004,018. In accordance with this process, a rubbery polymer of 1,3-butadiene which has a high percentage of the polymer formed by cis-1,4 addition of the butadiene is obtained when 1,3-butadiene is polymerized in the presence of a catalyst composition comprising (a) an organo metal compound corresponding to the formula:

$$R_nM$$

wherein R is an alkyl radical containing up to and including 12 carbon atoms; M is a metal selected from the group consisting of mercury and zinc; and n is an integer equal to the valence of the metal M; and (b) titanium tetraiodide. The polymer produced by this process contains from about 85 percent up to about 93 percent and higher cis-1,4 addition. Typical of the organo metal compounds contemplated are: dimethylmercury, diethylmercury, diisobutylmercury, dihexylmercury, dimethylzinc, diethylzinc, dibutylzinc, and dioctylzinc. The amount of organo metal compound used in the catalyst composition is usually within the range of 1 to 50 moles per mole of titanium tetraiodide, while the concentration of the total catalyst composition is usually in the range of 0.05 to 10 weight percent based on the total amount of 1,3-butadiene charged into the polymerization reactor. The polymerization of butadiene can be carried out in a temperature range of —80 to 150 degrees centigrade in the presence of a hydrocarbon diluent such as benzene, toluene, xylene, normal hexane, isooctane, normal decane, cyclohexane, methylcyclohexane and mixtures thereof. At the completion of the polymerization reaction, the catalyst is inactivated, the rubbery polymer is precipitated from solution with an alcohol, and is then separated from the diluent by suitable means such as filtration. Other methods have recently become known for producing polybutadiene containing at least 80 percent cis-1,4 configuration, and it is intended to encompass by the present invention the above-described cyclopentadiene adducts of such polybutadienes regardless of the process by which the cis-polybutadienes are produced. The polymers preferably contain at least 90 percent cis-1,4 configuration.

Typical polyhalogenated cyclopentadienes that can be used in the reaction are hexachlorocyclopentadiene, hexabromocyclopentadiene, 5,5-dibromotetrachlorocyclopentadiene, 5,5-difluorotetrachlorocyclopentadiene, 5,5-dimethoxytetrachlorocyclopentadiene, 5,5-diethoxytetrachlorocyclopentadiene and the like. Generally, the alkoxy radicals have one or two carbon atoms but higher carbon chains are contemplated.

In the process of the instant invention, it is preferred to utilize in the reaction mixture at least about five parts of polyhalogenated cyclopentadiene per part of rubber. The use of this ratio insures that sufficient halocyclopentadiene is available to obtain the desired reaction product in a reasonable length of time. However, lower ratios such as three to four parts of halocyclopentadiene can be used per part of rubber, but long reaction time is required. Much larger quantities of halocyclopentadiene can be utilized, e.g., up to 100 parts of halocyclopentadiene per part of rubber and higher. In fact, it is convenient to use the halocyclopentadiene as the diluent in the reaction mixture to reduce viscosity of the reaction mixture and to avoid the use of an extraneous diluent in the reaction system. However, other diluents that are not deleterious to the reaction can be used. Suitable diluents for this purpose are as follows: the aliphatic, cycloaliphatic, and aromatic hydrocarbons such as hexane, isooctane, normal decane, benzene, toluene, xylene, cyclohexane, methylcyclohexane and the like; chlorinated hydrocarbons such as chloroform, methylene chloride, trichloroethylene, tetrachloroethane, dichloropropane, propylene dibromide, trichlorobenzene, benzotrichloride, the chlorotoluenes and the like; ketones such as diethylketone, methylpropylketone, mesityl oxide and the like; esters such as isobutyl acetate, amyl acetate, butyl propionate, ethyl butyrate, and the like. Mixtures of the various solvents can also be used. The aromatic hydrocarbons are the preferred diluents. It is generally preferred that the boiling point of the diluent not exceed about 200 degrees centigrade to facilitate removal from the unreacted halocyclopentadiene. The ratio of solvent used in the reaction mixture generally does not exceed about 100 parts per part of rubber reacted.

The reaction of this invention proceeds best at elevated temperatures, preferably in the range of 100 to 170 degrees centigrade. However, higher and lower temperatures can be used, e.g., in the range of 70 to 200 degrees centigrade. It is generally convenient to conduct the reaction at atmospheric pressure, although, depending on the use of particular diluents and reaction temperatures, it is sometimes convenient to carry out the reaction at superatmospheric pressure or under vacuum.

During the course of the reaction, some halogen halide may be produced. The color of the resulting product can be improved by continuously absorbing the halogen halide as it is produced. This can be conveniently done by including a scavenger such as an epihalohydrin or other epoxide compounds in the reaction zone. The scavenger is usually included in the reaction mixture in an amount varying from 0.01 to 25 percent based on the weight of butadiene rubber. The actual amount used depends on reaction temperature, purity of starting materials, and quality (color) requirements of the final product.

As disclosed in Patent No. 3,268,475, the quality of the products of the invention can also be improved by carrying out the reaction in the presence of a stabilizer of the classes: nitro-substituted aromatics, phenol, and alkyl-substituted phenols. Preferred examples are compounds such as meta-dinitrobenzene, hydroquinone, or tertiary butyl catechol. Such stabilizers serve to control the molecular weight of the resulting polymer product. The stabilizers are generally employed in the reaction mixture in an amount varying from about 0.01 to 5 percent based on the weight of the butadiene rubbery polymer.

The following examples are presented to further illustrate the present invention, but not intended to limit the scope of the invention. In these examples, intrinsic viscosity was determined in toluene at 30 degrees centigrade.

The following Examples 1 to 5 show the effect of a stabilizer on the reaction of the invention.

*Example 1*

75 grams of "Cis-4" polybutadiene rubber having a cis-1,4 content of about 95 percent and an intrinsic viscosity of 2.15 dl./g., and 900 grams of hexachlorocyclopentadiene that had been treated with magnesium oxide for removal of impurities, were introduced into a reactor together with 15 cc. of epichlorohydrin. With the reactor under nitrogen atmosphere, the reactor contents were heated at about 100 degrees centigrade to dissolve the rubber. Thereafter, 0.1 gram meta-dinitrobenzene was added to the reactor, and the reaction was carried out for 5 hours with agitation at 150 degrees centigrade. The contents were discharged from the reactor with 990 cc. xylene. Then 100 grams of the resulting polymer solution was mixed with 75 grams of water and about 25 grams Triton X-100 emulsifying agent in a blender at 25 to 38 degrees centigrade. The resulting dispersion was poured into 500 cc. of normal amyl alcohol, while maintaining good agitation of the mixture. The resulting white, powdered polymer was centrifuged from the dispersion, washed with normal amyl alcohol, and then with isopropyl alcohol, and then dried in a vacuum oven for about 8 hours at 140 degrees centigrade and 3 mm. pressure. The polymer product had a chlorine content of 58.2 weight percent, and an intrinsic viscosity of 0.79 dl./g.

*Example 2*

75 grams of polybutadiene rubber having a cis-1,4 content of about 95 percent, and 900 grams of hexachlorocyclopentadiene that had been treated with magnesium oxide, were introduced into a reactor together with 15 cc. of epichlorohydrin. With the reactor open to the atmosphere, the reactor contents were heated for 3 hours at 110 degrees centigrade to dissolve the rubber, and then for 1 hour at 150 degrees centigrade. Thereafter, 0.1 gram meta-dinitrobenzene was added to the reactor, which was then flushed with nitrogen gas. The reaction was continued for 4 hours with agitation at 150 degrees centigrade. Then 100 grams of the resulting polymer solution was mixed with 100 grams of water and about 5 cc. Triton X-100 emulsifying agent in a blender at 25 to 38 degrees centigrade. The resulting dispersion was poured into 400 cc. of normal amyl alcohol, while maintaining good agitation of the mixture. The resulting white powdered polymer was centrifuged from the dispersion, washed with normal amyl alcohol, and then with isopropyl alcohol, and then dried in a vacuum oven for about 8 hours at 140 degrees centigrade and 3 mm. pressure. The polymer product had a chlorine content of 59.5 weight percent, and an intrinsic viscosity of 0.459 dl./g.

*Example 3*

75 grams of "Cis-4" polybutadiene having a cis-1,4 content of about 95 percent, 900 grams of magnesium oxide-treated hexachlorocyclopentadiene, and 15 cc. of epichlorohydrin, were heated in an open reactor for 2½ hours at 110 degrees centigrade, and, thereafter, at 150 degrees centigrade for 2 hours. Then, 0.1 gram of meta-dinitrobenzene was introduced into the reactor which was then flushed with nitrogen gas. The reaction was continued for 3 hours at 150 degrees centigrade. The product was recovered from the reactor product in the same manner as in Example 1, and found to have a chlorine content of 59.2 percent and an intrinsic viscosity of 0.463 dl./g.

*Example 4*

75 grams of "Cis-4" polybutadiene having about 95 percent cis-1,4 configuration, 900 grams of magnesium oxide-treated hexachloropentadiene and 15 cc. epichlorohydrin, were heated in an open reactor at 110 degrees centigrade for 2.25 hours, and, thereafter, for 3 hours at 150 degrees centigrade. Then, 0.1 gram of meta-dinitrobenzene was added to the reactor which was flushed with nitrogen gas. The reaction was continued for an additional 2 hours at 150 degrees centigrade. The product that was recovered from the reaction mixture was found to have a chlorine content of 59.4 percent, and an intrinsic viscosity of 0.345 dl./g.

*Example 5*

75 grams of "Cis-4" polybutadiene having about 95 percent cis-1,4 configuration, 900 grams of magnesium oxide-treated hexachlorocyclopentadiene and 15 cc. of epichlorohydrin, were heated in an open reactor at 90–100 degrees centigrade for 4 hours until all the rubber was in solution. Then the temperature was raised to 150 degrees centigrade for 5 hours. The product was recovered using the procedure of Example 1, and found to have a chlorine content of 58.4 weight percent and an intrinsic viscosity of 0.320.

The following table summarizes the effect or intrinsic viscosity of adding meta-dinitrobenzene (DNB) at various stages of the five hour reaction periods of Examples 1 to 5.

|  | Example Number | | | | |
|---|---|---|---|---|---|
|  | 1 | 2 | 3 | 4 | 5 |
| Hours at 150° C. with DNB present | 5 | 4 | 3 | 2 | 0 |
| Intrinsic Viscosity, dl./g | 0.79 | 0.459 | 0.463 | 0.345 | 0.320 |

These results show that as the stabilizer was maintained in the reaction system for progressively shorter periods, the molecular weight of the product decreased, as indicated by intrinsic viscosity. Similar results are obtained by varying the quantity of stabilizer used.

The following Examples 6 and 7 show the use of inert diluents in the reaction system.

*Example 6*

25 grams of "Cis-4" polybutadiene rubber having a cis-1,4 content of about 95 percent was dissolved in an agitated mixture of 200 grams of hexachlorocyclopentadiene and 250 cc. of acetylene tetrachloride, both of which had been treated with magnesium oxide for removal of impurities and 3 cc. of epichlorohydrin under nitrogen atmosphere at about 95 degrees centigrade. The solution was stirred and heated under refluxing conditions at 151 to 157 degrees centigrade for 24 hours. Essentially, no hydrogen chloride was evolved from the reaction mixture. At the conclusion of the reaction, the reaction product was poured into methanol, redissolved in toluene, and then reprecipitated from methanol. The solid product was finally steam distilled with 2 liters of water to insure removal of the hexachlorocyclopentadiene and solvent. The resulting product was cream-colored solid that was insoluble in aliphatic hydrocarbons, acetone and methanol, but readily soluble in aromatic hydrocarbons and chlorinated hydrocarbons. The product was not attacked by concentrated sulfuric acid or caustic at room temperature. The chlorine content of the product was 59.2 weight percent.

*Example 7*

50 grams of "Cis-4" polybutadiene rubber having a cis-1,4 content of 95 percent and 320 grams of hexachlorocyclopentadiene that had been treated with magnesium oxide for removal of impurities and 200 cc. xylene, commercial grade, were introduced into a reactor together with 10 cc. epichlorohydrin. With the reactor open to the atmosphere, the reactor contents were heated for 3 hours at 90-100 degrees centigrade with agitation, to dissolve the rubber, and then for 5 hours at 150 degrees centigrade. At this point, the system was flushed with nitrogen gas to give an air free atmosphere, and continued heating at 150 degrees centigrade for 15 hours more. 150 grams of the resulting polymer solution was mixed with 150 grams water and 10 cc. Triton X-100 emulsifying agent in a blender at 30-35 degrees centigrade. The resulting dispersion was poured into 400 cc. normal amyl alcohol, while maintaining good agitation of the mixture. The resulting white powdered polymer was centrifuged from the dispersion, washed with normal amyl alcohol, and then with isopropyl alcohol, and dried in a vacuum oven for 4 to 6 hours at 140 degrees centigrade/3 mm. The polymer product had a chlorine content of 57.9 weight percent and an intrinsic viscosity of 0.4504 dl./g.

*Example 8*

This example shows the incorporation of almost 0.9 mole of hexachlorocyclopentadiene per mole of butadiene in the rubber.

25 grams of "Cis-4" polybutadiene rubber having a cis-1,4 content of about 95 percent and 300 grams of hexachlorocyclopentadiene that had been treated with Maglite for removal of impurities, were introduced into a reactor. No epichlorohydrin was used. With the reactor open to the atmosphere, the reactor contents were heated for 7½ hours at 130 degrees centigrade to dissolve the rubber, and then for 5 hours at 150 degrees centigrade with agitation. Then 200 grams of the resulting polymer solution was mixed with 100 grams of water and about 5 cc. Triton X-100 emulsifying agent in a blender at 25 to 38 degrees centigrade. The resulting white, powdered polymer was centrifuged from the dispersion, washed with normal amyl alcohol, and then with isopropyl alcohol, and then dried in a vacuum oven for about 6 hours at 140 degrees centigrade and 3 mm. pressure. The polymer product had a chlorine content of 63.6 weight percent.

*Example 9*

This example shows the use of tetrachlorodimethoxycyclopentadiene in the reaction with polybutadiene.

15 grams of "Cis-4" polybutadiene having a cis-1,4 content of about 95 percent, 180 grams of 1,2,3,4-tetrachloro-5,5-dimethoxycyclopentadiene, and 3 grams of epichlorohydrin were heated in an open reactor at 98 to 106 degrees centigrade for about 1 hour until the rubber was in solution. The reactor temperature was raised to 150 degrees centigrade for 5 hours. The polymer product was precipitated from solution with isopropyl alcohol, redissolved in xylene, and reprecipitated from solution twice with isopropyl alcohol. The resulting white solid product had a chlorine analysis of 39.4 percent. This corresponded to an incorporation of about 0.55 mole of the diene per mole of combined butadiene in the rubber.

The following Examples 10 to 12 show the use of other commercial rubbers with a high cis-1,4 content.

*Example 10*

75 grams of "Cisdene" polybutadiene rubber having a cis-content of about 95 percent and 900 grams of magnesium oxide treated hexachlorocyclopentadiene, were introduced into a reactor together with 15 cc. epichlorohydrin. With the reactor open to the atmosphere, the reactor contents were heated for 10 hrs. at 90-100 degrees centigrade to dissolve the rubber and then for 5 hours at 150 degrees centigrade. 200 grams of the resulting polymer solution was mixed with 100 grams of water and 5 cc. Triton X-100 emulsifying agent in a blender at 25-38 degrees centigrade. The resulting dispersion was poured into 500 cc. normal amyl alcohol, while maintaining good agitation. The resulting white powdered polymer was centrifuged from the dispersion, washed with normal amyl alcohol, and then with isopropyl alcohol and dried in a vacuum oven for 4 to 6 hours at 100 degrees centigrade/4 mm. The polymer product had a chlorine content of 59.7 weight percent, and an intrinsic viscosity of 0.3120 dl./g.

*Example 11*

75 grams of "Budene 501" polybutadiene rubber having a cis content of about 95 percent and 900 grams of magnesium oxide-treated hexachlorocyclopentadiene, were introduced into a reactor along with 15 cc. epichlorohydrin. With the reactor open to the atmosphere, the reactor contents were heated four hours at 95 degrees centigrade to dissolve the rubber, and then for five hours at 150 degrees centigrade. 200 grams of the polymer solution was mixed with 100 grams water and 5 cc. Triton X-100 emulsifying agent in a blender at 25-38 degrees centigrade. The resulting dispersion was precipitated in 500 cc. normal amyl alcohol, while maintaining good agitation of the mixture. The resulting white powdered polymer was centrifuged from the dispersion, washed with normal amyl alcohol, and then with isopropyl alcohol, and dried in a vacuum oven for 4 hours at 100 degrees centigrade/4 mm. pressure. The polymer product had a chlorine content of 58.5 weight percent and an intrinsic viscosity of 0.3290 dl./g.

*Example 12*

75 grams of "Ameripol CB" polybutadiene rubber having a cis content of about 95 percent, and 900 grams of hexachlorocyclopentadiene were introduced into a reactor along with 15 cc. epichlorohydrin. With the reactor open to the atmosphere, the reactor contents were heated for 3 hours at 98 degrees centigrade to dissolve the rubber, and then for 5 hours at 150 degrees centigrade. 200 grams of the resulting polymer solution was mixed with 100 grams water and 5 cc. Triton X–100 emulsifying agent in a blender at 25–38 degrees centigrade. The resulting dispersion was precipitated in 500 cc. normal amyl alcohol, while maintaining good agitation. The resulting white powdered polymer was centrifuged from the dispersion, washed with normal amyl alcohol, and then with isopropyl alcohol, and dried in a vacuum oven for 4 hours at 100 degrees centigrade/4 mm. pressure. The polymer product had a chlorine content of 56.1 weight percent and an intrinsic viscosity of 0.2277 dl./g.

The following Examples 13 to 18 show the results of reacting a polyhalogenated cyclopentadiene with butadiene rubbers having a low cis-1,4 content or with isoprene rubbers.

*Example 13*

75 grams of a polybutadiene having a cis-1,4 content of only 35 percent was heated with 600 grams hexachlorocyclopentadiene and 15 cc. of epichlorohydrin and heated at 100 to 112 degrees centigrade for 3 hours in an air atmosphere. Then, an additional 300 grams of hexachlorocyclopentadiene was added to the reactor, and heating was continued until all the rubber was in solution. Then, the reactor temperature was raised to 147 to 150 degrees centigrade for about 8.5 hours. The reaction product was emulsified in water with Triton X–100 emulsifying agent, and precipitated with alcohol. The resulting solid was redissolved in xylene and reprecipitated with isopropyl alcohol twice. The solid product was dried in a vacuum oven and found to have a chlorine content of only 50.8 percent, corresponding to an incorporation of less than 0.4 mole of hexachlorocyclopentadiene per mole of combined butadiene in the rubber.

*Example 14*

75 grams of an emulsion-polymerized styrene-butadiene copolymer rubber, 900 grams of hexachlorocyclopentadiene and 15 grams of epichlorohydrin were heated in air for 5 hours at 105 degrees centigrade, and then for 5 hours at 150 degrees centigrade. The reaction product was very dark amber in color, and treatment with alcohol to precipitate the polymer yielded only a small amount of a low molecular weight gum.

*Example 15*

Example 14 was repeated except that the reaction was carried out under a nitrogen atmosphere and 0.1 gram of meta-dinitrobenzene was added to the reaction mixture in an attempt to prevent degradation of the polymer product. A gummy solid product was precipitated from the reaction mixture with isopropyl alcohol, was redissolved in xylene and reprecipitated. After vacuum drying, the product was gummy solid having a chlorine content of 34.7 percent.

*Example 16*

75 grams of a polyisoprene having a high cis-content, 900 grams of hexachlorocyclopentadiene, and 15 cc. of epichlorohydrin were introduced into the reactor, and agitated at 100 degrees centigrade for 5.5 hours until all the rubber was in solution. Then, 2 grams of meta-dinitrobenzene were added to the reactor in an attempt to prevent degradation of the rubber. Then, the reactor contents were heated at 150 degrees centigrade for 6 hours. The reaction product was poured into isopropyl alcohol to precipitate the product. An oily product resulted which was dissolved in xylene, and reprecipitated again from isopropyl alcohol. A small amount of a sticky rubber product having a chlorine content of 12.7 weight percent was recovered.

*Example 17*

75 grams of natural rubber 900 grams of hexachlorocyclopentadiene and 15 cc. of epichlorohydrin were introduced into a reactor, stirred and heated in air at 105 degrees centigrade. After the rubber had gone in solution, the reactor temperature was raised to 150 degrees centigrade and held for 6 hours. At the end of this time, the reaction mixture was very dark. The reaction product was treated with isopropyl alcohol, and there was precipitated a soft black paste, having a chlorine content of 11.3 weight percent.

*Example 18*

An attempt was made to react hexachlorocyclopentadiene, a butadiene-acrylonitrile rubber, but it was found that the rubber was virtually insoluble in an excess of hexachlorocyclopentadiene even after heating for 7.5 hours at 106 degrees centigrade.

The following example shows the use of the products of the invention in preparing coatings.

*Example 19*

Polymer product prepared in accordance with Example 2 was dissolved in the following mixture of solvents:

| | Parts |
|---|---|
| Polymer product of Ex. 2 | 800 |
| "Amsco D" solvent | 1200 |
| V.M. & P. naphtha | 100 |
| Mineral spirits | 100 |
| Xylene | 300 |

This solution was added to the following mixture of components which has been pebble-milled for 30 hours:

| | |
|---|---|
| Polymer product of Ex. 2 | 100 |
| TiO$_2$ (non-chalking) | 800 |
| Asbestine 425 ® | 100 |
| Lecithin | 5 |
| Dioctyl phthalate | 200 |
| Bentone 27 (prewet with n-butanol) | 15 |
| Colloidal silica | 5 |
| Co (6%) naphthanate | 3 |
| Pb (24%) naphthenate | 8 |
| "Amsco D" solvent | 500 |

The resulting coating composition had the following characteristics:

| | |
|---|---|
| Brushing characteristics | Good |
| Weight per gallon | 9.82 |
| Non-volatiles, percent | 4.96 |
| Viscosity, cps. Brookfield at 30 r.p.m. | 1760 |
| Fineness of grind, Hegman | 6½ |
| Adhesion: | |
| (Knife cut on steel) | Good |
| (Knife cut on galv. iron) | Good |
| Gloss | Semi-gloss |
| Mandrel flexibility | Pass ⅛" |
| Chemical Resistance:[1] | |
| Distilled water | No effect |
| 5% sodium hydroxide | No effect |
| 5% sulfuric acid | No effect |

[1] Determined by allowing a drop of reagent to lay for 24 hours on the surface of the paint coated on a steel panel.

Example 20

This example shows the use of the products of the invention as molding compounds.

Twelve grams of the product of Example 1 with an intrinsic viscosity of 0.79 was carefully blended with 0.12 gram of Ciba 502 epoxy resin, used as a stabilizer, and poured into a bar mold with sprues. (Standard size —½" v ⅛" x 5".) The temperature was raised from room temperature to 175° C. and maintained at 20,000 p.s.i. on the platen. When the mold closed, cooling water was turned on to quench. This quench produces an ejection from the mold and a bar free of cavities and paralleling the mold size. The color of the bar was a transparent amber with a high gloss finish and slightly flexible. Barcol hardness was 20–21 and the second order transition point was about 107° C.

The polymer products of this invention are soluble in solvents such as toluene, xylene, cyclohexanone, methylene chloride, trichloroethylene, ortho-dichlorobenzene, perchloroethylene, methyl-n-butyl ketone, turpentine, and n-butyl acetate. The polymers are swollen by solvents such as V.M. & P. naphtha, cyclohexane, 2-nitro-propane, ethyl acetate, and methyl ethyl ketone.

The polymer products are compatible with materials such as 70% chlorinated paraffin, dioctyl phthalate, and commercial plasticizers such as "Santicizer B–66" and "Arochlor 1262."

As shown in the foregoing examples, polymer products can be produced in accordance with the invention having a wide variety of molecular weights. Generally, the intrinsic viscosity of the products is in the range of 0.2 to 1 dl./g., but higher and lower values can be obtained.

It is understood that the details provided in the foregoing specification can be modified by those skilled in the art without departing from the spirit and scope of the invention.

I claim:

1. The thermoplastic resin of polybutadiene having at least 80 percent of cis-1,4 configuration, and a polyhalogenated cyclopentadiene having the formula:

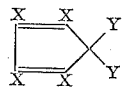

wherein X is selected from the group consisting of fluorine, chlorine and bromine and Y is selected from the group consisting of fluorine, chlorine, bromine and an alkoxy radical; wherein said thermoplastic resin has said polyhalogenated cyclopentadiene reacted across greater than 50 percent of the original double bonds in the polybutadiene.

2. The thermoplastic resin of polybutadiene having at least 80 percent of cis-1,4 configuration, and a polyhalogenated cyclopentadiene having the formula:

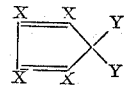

wherein X is selected from the group consisting of fluorine, chlorine and bromine and Y is selected from the group consisting of fluorine, chlorine, bromine and an alkoxy radical; wherein said thermoplastic resin has said polyhalogenated cyclopentadiene reacted across at least about 60 percent of the original double bonds in the polybutadiene.

3. The thermoplastic resin of claim 2 which has said polyhalogenated cyclopentadiene reacted across from about 60 to about 90 percent of the original double bonds in the polybutadiene.

4. The thermoplastic resin of claim 1 wherein the polyhalogenated cyclopentadiene is hexachlorocyclopentadiene.

5. The thermoplastic resin of claim 1 wherein the halogenated cyclopentadiene is 1,2,3,4 - tetrachloro - 5,5 - dimethoxycyclopentadiene.

References Cited

UNITED STATES PATENTS

| | | | |
|---|---|---|---|
| 2,979,488 | 4/1961 | Carpenter | 260—79 |
| 3,098,058 | 7/1963 | Schweiker et al. | 260—94.7 |

JOSEPH L. SCHOFER, *Primary Examiner.*

H. I. CANTOR, *Assistant Examiner.*